US012718315B2

(12) United States Patent
Rick et al.

(10) Patent No.: US 12,718,315 B2
(45) Date of Patent: Aug. 25, 2026

(54) APPLICATIONS OF MONO TO STEREO CONVERSION

(71) Applicant: Apple Inc., Cupertino, CA (US)

(72) Inventors: Tobias Rick, Mountain View, CA (US); Alexandre Da Veiga, San Francisco, CA (US); Alexander Menzies, Menlo Park, CA (US); Vladlen Koltun, Jackson, WY (US); Vicki M Murley, Pacifica, CA (US); Dean Jackson, Yass (AU); Chelsea E Pugh, San Francisco, CA (US); Alexa Rockwell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 18/680,478

(22) Filed: May 31, 2024

(65) Prior Publication Data

US 2024/0414308 A1 Dec. 12, 2024

Related U.S. Application Data

(60) Provisional application No. 63/652,218, filed on May 28, 2024, provisional application No. 63/472,156, filed on Jun. 9, 2023.

(51) Int. Cl.

| | |
|---|---|
| ***G06T 3/10*** | (2024.01) |
| ***H04N 13/261*** | (2018.01) |
| ***H04N 13/344*** | (2018.01) |
| ***H04N 13/351*** | (2018.01) |
| ***H04N 13/383*** | (2018.01) |

(52) U.S. Cl.
CPC ............ *G06T 3/10* (2024.01); *H04N 13/261* (2018.05); *H04N 13/344* (2018.05); *H04N 13/351* (2018.05); *H04N 13/383* (2018.05)

(58) Field of Classification Search
None
See application file for complete search history.

(56) References Cited

U.S. PATENT DOCUMENTS

| | | | | |
|---|---|---|---|---|
| 5,825,340 | A | 10/1998 | Torizuka et al. | |
| 10,592,013 | B2 | 3/2020 | Mandel-laia et al. | |
| 10,769,754 | B2 | 9/2020 | Chapiro et al. | |
| 11,301,047 | B2 | 4/2022 | Stafford | |
| 2017/0076429 | A1* | 3/2017 | Russell | G06T 15/04 |
| 2018/0082482 | A1* | 3/2018 | Motta | G02B 27/0093 |

(Continued)

FOREIGN PATENT DOCUMENTS

| | | | |
|---|---|---|---|
| CN | 108289216 | A | 7/2018 |
| EP | 3109734 | A1 | 12/2016 |

(Continued)

*Primary Examiner* — Bernard Krasnic
(74) *Attorney, Agent, or Firm* — Thompson Hine LLP

(57) ABSTRACT

Various implementations disclosed herein include devices, systems, and methods that dynamically apply a 3D effect to a 2D asset. For example, a process may obtain an image depicting two-dimensional (2D) content. The process may further determine to apply a three-dimensional (3D) effect to the image via a head mounted device (HMD). The process may further, in accordance with determining to apply the 3D effect to the image, present a view of a 3D environment including the image. The image may be positioned at a location within the 3D environment and the view may depict the image using the 3D effect.

19 Claims, 8 Drawing Sheets

(56) References Cited

U.S. PATENT DOCUMENTS

| | | | | |
|---|---|---|---|---|
| 2018/0144541 | A1* | 5/2018 | Champion | H04N 13/106 |
| 2018/0144556 | A1* | 5/2018 | Champion | G06F 3/04815 |
| 2022/0101593 | A1* | 3/2022 | Rockel | G06F 3/011 |
| 2023/0031832 | A1 | 2/2023 | Lipton et al. | |
| 2023/0052104 | A1* | 2/2023 | Yang | G06F 3/011 |
| 2024/0087267 | A1* | 3/2024 | Maschmeyer | G06T 11/00 |
| 2024/0377640 | A1* | 11/2024 | Asaban | G06T 19/006 |

FOREIGN PATENT DOCUMENTS

| | | | | |
|---|---|---|---|---|
| JP | 20000207575 | A | 7/2000 | |
| JP | 2004046261 | A1 | 2/2004 | |
| JP | 7200343 | B2 * | 1/2023 | G06F 1/1624 |
| KR | 2016-0116145 | | 10/2016 | |
| WO | WO-2021080733 | A1 * | 4/2021 | G06F 3/04845 |
| WO | WO-2021146978 | A1 * | 7/2021 | G06T 19/00 |
| WO | WO-2022197493 | A1 * | 9/2022 | G06F 3/0482 |

* cited by examiner

APPLICATIONS OF MONO TO STEREO CONVERSION

CROSS-REFERENCE TO RELATED APPLICATIONS

This Application claims the benefit of U.S. Provisional Application Ser. No. 63/652,218, filed May 28, 2024, and U.S. Provisional Application Ser. No. 63/472,156, filed Jun. 9, 2023, which are incorporated herein in their entirety.

TECHNICAL FIELD

The present disclosure generally relates to systems, methods, and devices that dynamically apply a 3-dimensional (3D) effect to a 2-dimensional (2D) asset.

BACKGROUND

Existing techniques for viewing 2D image content may not adequately facilitate viewing of such image content with effects that improve the realism or other aspects of the image content to provide desirable viewing experiences.

SUMMARY

Various implementations disclosed herein include devices, systems, and methods that dynamically apply a 3D effect to a 2D asset such as, inter alia, an image (e.g., a standard image, a panoramic image, etc.) or a video from a photo library, a Webpage, a Web browser, etc. The 3D effect may be applied to a 2D asset in real time or subsequent to an elapsed time period for display via a head mounted device (HMD). Applying the 3D effect may be triggered manually in response to, inter alia, a user activating a button or switch. Alternatively, applying the 3D effect may be triggered by a user initiating a gesture in response to a glow effect or icon presented proximate to the image on a Webpage. For example, a glow effect or icon presented proximate to an image on a Webpage may be triggered in response to a detected user gaze direction with respect to the image depicting the 2D asset (e.g., the user looking at the 2D asset). In response to the glow effect or icon being presented proximate to the image, the user may activate a button, a switch, the icon, an input command (e.g., a hand gesture such as a plucking gesture, etc.), etc.

In some implementations, applying the 3D effect may be triggered automatically based on a detected user gaze direction with respect to the image depicting the 2D asset (e.g., the user looking at the 2D asset). Alternatively, applying the 3D effect may be triggered automatically based on content depicted in the 2D asset. For example, content (e.g., of a photo) depicting objects in nature (e.g., mountains, canyons, rivers, etc.) and/or people may automatically trigger application of the 3D effect to the 2D asset, while a receipt (in a photo) will not trigger application of the 3D effect to the 2D asset. In some implementations, applying the 3D effect may be triggered automatically based on an expected quality of 3D effect. For example, an expected quality for 3D effect for a photo may be determined to be low (e.g., producing an error prone or noisy result) and therefore applying the 3D effect is not triggered. In some implementations, applying the 3D effect may be triggered automatically based on metadata (e.g., comprising instructions) of the 2D asset. In some implementations, applying the 3D effect may be triggered automatically based on application developer initiated setting within an application presenting the image depicting the 2D content.

In some implementations with respect to Web based applications, a Web browser may be configured to evaluate images of a Web page to determine if the images are suitable for 3D presentation and based on results of the evaluation, an indication that the 3D effect may be applied to the image may be provided for a user. For example, a glow effect or icon (indicating suitable 3D attributes) may be presented proximate to an image.

In some implementations with respect to Web based applications, an image may be depicted using the 3D effect without depicting any other portions of the Webpage using the 3D effect. For example, the 3D effect may only be applied to the image without applying the 3D effect to the Webpage.

In some implementations with respect to Web based applications, an image may be depicted using the 3D effect without depicting any other portions of the Webpage. For example, portions of the Webpage surrounding the image may be hidden or blurred out, the image may be depicted in full screen mode, the image may be surrounded by a feathering or dimming effect obscuring the Webpage from being presented within a background surrounding the image, etc.

In some implementations with respect to Web based applications, the 3D effect may be applied to an image based on prioritizing an importance of the image with respect to other portions of a Webpage. For example, the image may be larger than other images of the Webpage and therefore it may be determined that applying a 3D effect to this image should be prioritized over the other images.

In some implementations, an initial view (for image preview) of an image may depict a low-resolution version of the image using a 3D effect and a subsequent view may depict a high-resolution version of the image using the 3D effect.

In some implementations, an adjustable baseline (e.g., relative to a user IPD) may be used to provide differing 3D effects (e.g., realistic, exaggerated, etc.) to the 2D asset.

In some implementations, the 3D effect is provided by altering the 2D asset with respect to left and right eye views via display of an HMD. Altering the image with respect to left and right eye views may provide a vergence effect to provide the 3D effect.

In some implementations, the 3D effect is provided by providing altered views of the 2D asset based on differing viewpoints within the 3D environment (e.g., via an HMD). Providing altered views of the 2D asset based on differing viewpoints within the 3D environment may provide a parallax effect to provide the 3D effect.

In some implementations, an HMD has a processor (e.g., one or more processors) that executes instructions stored in a non-transitory computer-readable medium to perform a method. The method performs one or more steps or processes. In some implementations, the HMD obtains an image depicting 2D content. In some implementations, it is determined to apply a 3D effect to the image via the HMD. In accordance with determining to apply the 3D effect to the image, a view of a 3D environment including the image is presented to a user. The image may be positioned at a location within the 3D environment and the view may depict the image using the 3D effect.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
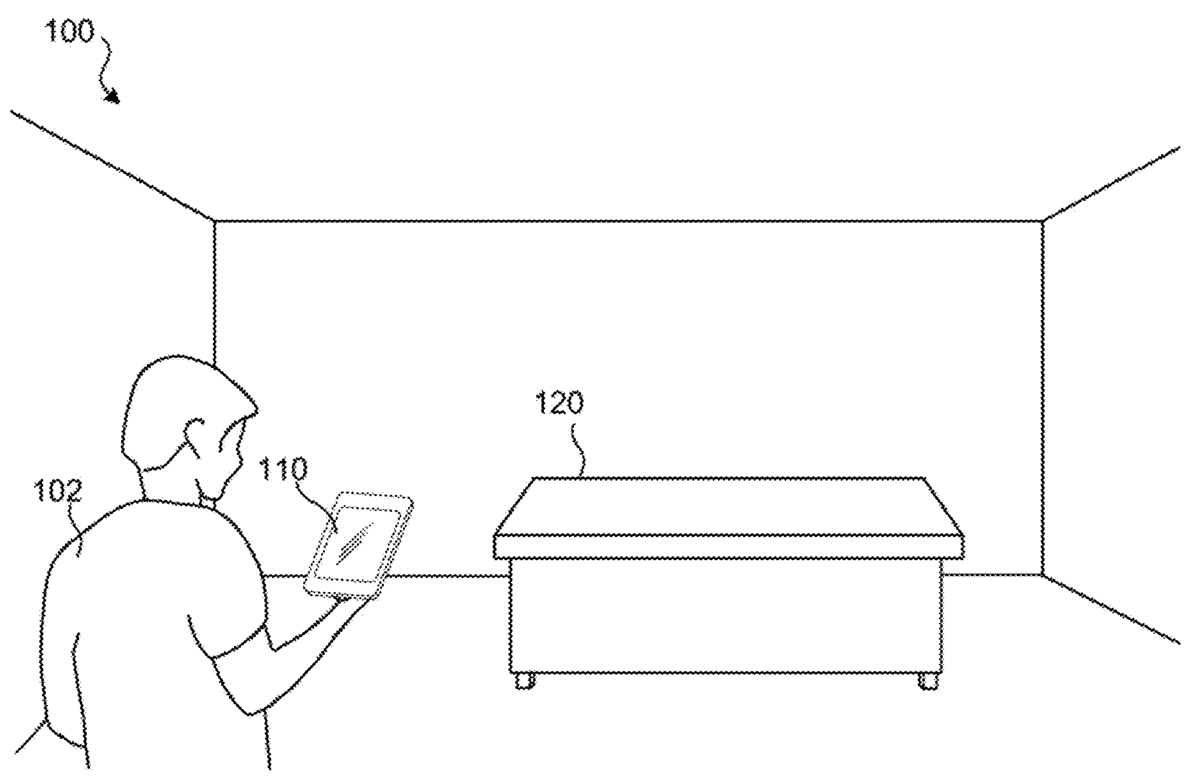
FIGS. 1A-B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
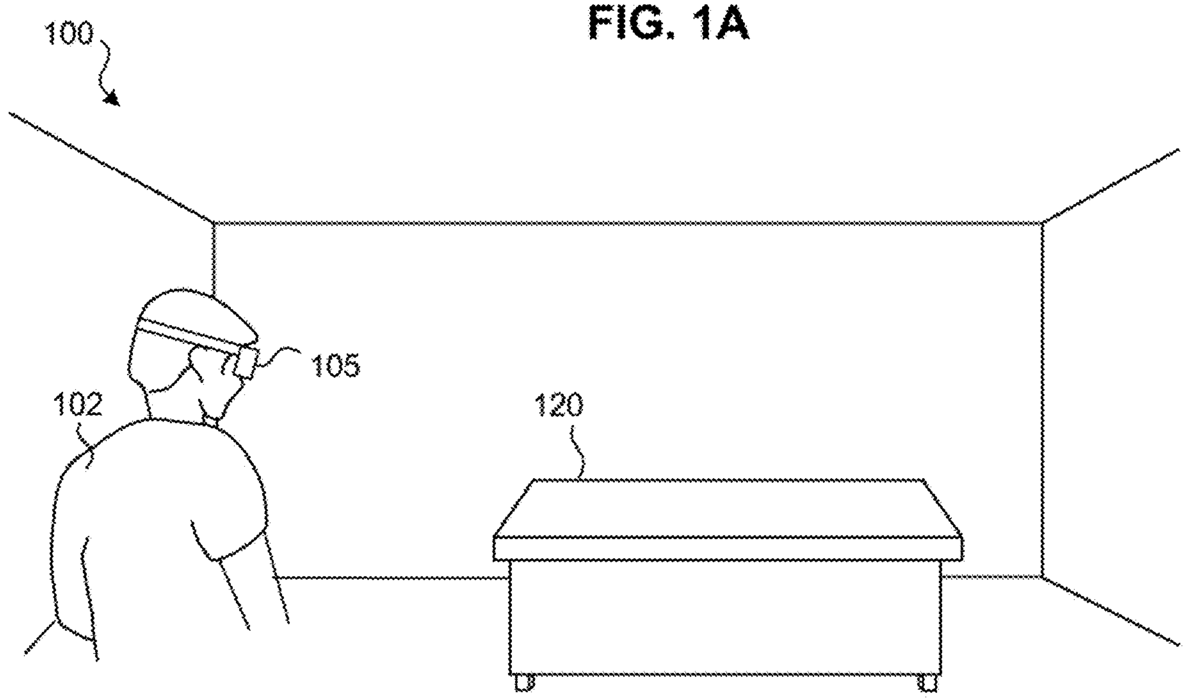

FIGS. 1A-B illustrate exemplary electronic devices 105 and 110 operating in a physical environment 100. In the example of FIGS. 1A-B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, an HMD (e.g., device 105) communicatively coupled to a server, or other external device may be configured to accept a 2D input image (e.g., a standard or panoramic image(s) from a photo library or a Webpage/Web browser) and apply (in real time or subsequent to a dwell time) a (synthesized) 3D (stereo) output effect (based on a left and right eye images) for rendering via the HMD during a viewing session. A synthesized 3D stereo output effect (based on a left and right eye images) may be applied for rendering via usage of machine learning (ML) based mono to stereo conversion techniques. An adjustable baseline (e.g., a user interpupillary distance (IPD)) may be used to provide differing effects (e.g., realistic, exaggerated, etc.) associated with the 3D output effect. Applying the 3D output effect (for rendering) may be triggered manually or automatically. A manual process to apply the 3D output effect may include activating (by a user) a button or switch when the user intends to apply the 3D output effect to 2D input image.

In some implementations, a glow effect or icon may be triggered in response to a detected user gaze with respect to an image on a Webpage. The glow effect or icon may indicate that the image is suitable for applying the 3D output effect and may be presented (via a display of an HMD) proximate to the image. In response to the glow effect or icon presented proximate to the image, the user may activate a button, a switch, the icon, an input command (e.g., a hand gesture, a mouse click, etc.) associated with the glow effect, etc.

An automated process to apply the 3D output effect may include selecting a 2D input image based on detecting a user gaze direction with respect to the 2D input image (e.g., user looking at the 2D input image). Likewise, applying the 3D effect may be triggered automatically based on content depicted within the 2D input image. For example, content (e.g., of a photo) depicting natural objects (e.g., mountains, tress, etc.) and/or people may automatically trigger application of the 3D output effect to the 2D input image. Likewise, text (e.g., of a receipt) may not trigger application of the 3D output effect to the 2D input image. Alternatively, applying the 3D effect may be triggered automatically based on an expected quality of the 3D output effect. For example, a 2D input image, such as a photo, may be determined to be error prone or noisy (e.g., a random variation in the photo caused by poor lighting conditions) and consequently the 3D output effect is not triggered. Some implementations include triggering the 3D output effect automatically based on metadata (e.g., comprising instructions) of the 2D input image. Some implementations include triggering the 3D output effect automatically based on an application developer initiated setting within an application presenting the 2D input image. Applying the 3D effect to the 2D input image may not require the use of any depth information.

In some implementations a 3D (stereo) output effect is applied to a 2D input image of a Webpage/Web browser for 3D rendering via an HMD during a viewing session. Some implementations enable a Web browser to evaluate an image(s) of a Web page to determine if the image(s) is suitable for 3D presentation. If the image(s) is determined as suitable for 3D presentation, an indication (a glow effect or icon proximate to the image) that a 3D output effect may be applied to the image(s) is displayed for a user. Likewise, if the image(s) is determined not to be suitable for 3D presentation, a differing indication (an alternative glow effect or icon proximate to the image) that the 3D effect may be not applied to the image is displayed for the user.

In some implementations an image may be depicted using a 3D output effect without depicting any other portions of a Webpage using the 3D output effect. For example, the 3D output effect may only be applied to the image without applying the 3D output effect to the Webpage. In some implementations, an image may be depicted using a 3D output effect without depicting any other portions of a Webpage. For example, the Webpage may be hidden or blurred out, the image may be depicted in full screen mode, the image may be surrounded by a feathering or dimming effect obscuring the Webpage from a background region surrounding the image, etc.

In some implementations, a 3D output effect may be applied to an image based on prioritizing an importance of the image with respect to other portions of a Webpage. For example, the image may be larger than other images of the Webpage and therefore it may be determined that applying a 3D output effect to this image should be prioritized over the other images.

In some implementations, an initial view of an image may depict a low resolution version of the image using a 3D output effect and a subsequent view may depict a high resolution version of the image using the 3D output effect.

Figure 2:
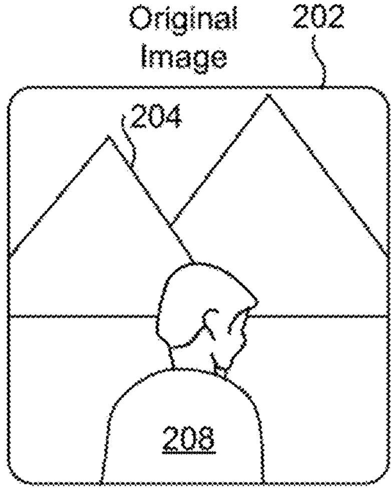
FIG. 2 illustrates an example representing the application of a 3D effect to a 2D image retrieved for viewing by a user, in accordance with some implementations.
Figure 2:
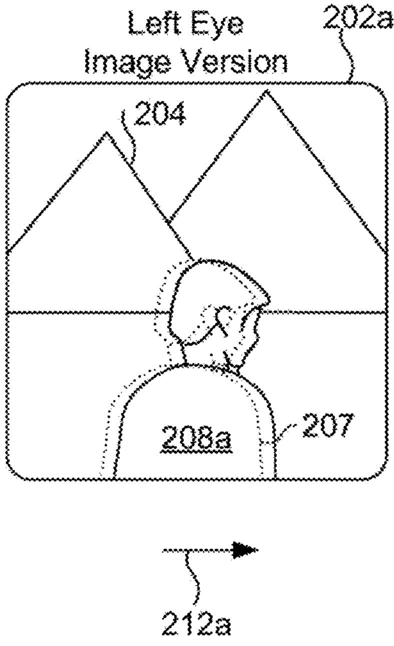
Figure 2:
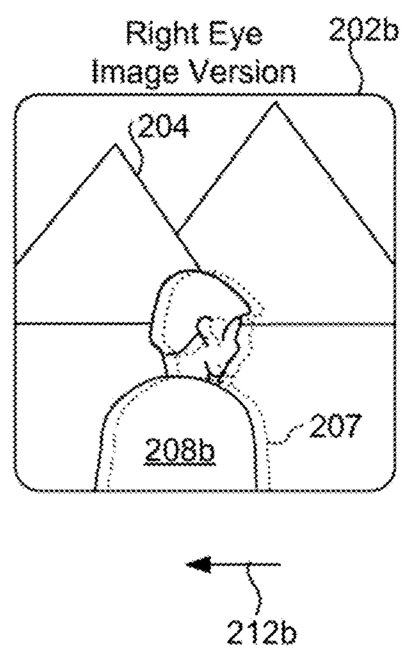

FIG. 2 illustrates an example representing the application of a 3D effect to an original 2D image 202 (with respect to providing a vergence effect) retrieved (e.g., from a photo application of an HMD) for viewing by a user, in accordance with some implementations. The original 2D image 202 comprises a photo of a person 208 in a foreground and mountains 204 in a background. Applying the 3D effect to the original 2D image 202 comprises altering the original 2D image 202 by providing (for the user to view via, e.g., an HMD) a left eye image version 202*a* (of the original 2D image 202) and a right eye image version 202*b* (of the original 2D image 202). The left eye image version 202*a* represents a view 208*a* of the person 208 located at a first position (e.g., shifted horizontally in a direction 212*a*) differing from an original position 207 of the user 208 in the original 2D image 202. The right-eye image version 202*b* represents a view 208*b* of the person 208 located at a second position (e.g., shifted horizontally in a direction 212*b*) differing from the original position 207 of the user 208 in the original 2D image 202. The first position represents the user 208 at a different location within left eye image version 202*a* than the second position within right eye image version 202*b*. Therefore, when viewed via an HMD, the combination of left eye image version 202*a* and right eye image version 202*b* are presented (to a user) as a merged image representing a 3D effect with respect to person 208.

Figure 3:
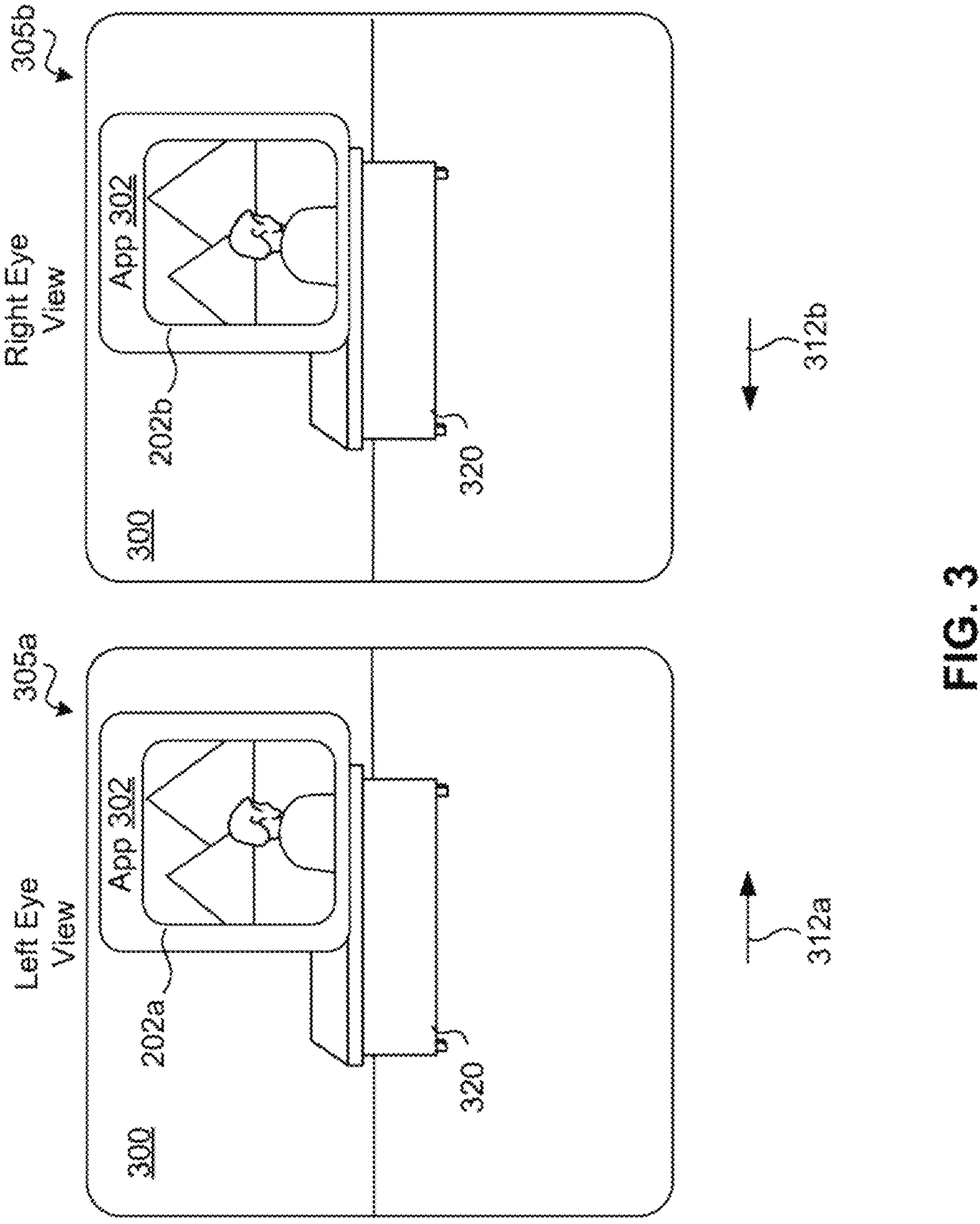
FIG. 3 illustrates a left eye image version and right eye image version presented within an application user interface (UI) positioned within a 3D environment, in accordance with some implementations.

FIG. 3 illustrates left eye image version 202*a* and right eye image version 202*b* of FIG. 2 presented within an application user interface (UI) 302 positioned within a 3D environment 300, in accordance with some implementations. 3D environment includes a physical environment (e.g., physical environment 100 of FIG. 1) comprising a desk 320 and a virtual object comprising application UI 302. Application UI 302 may comprise any type of software application UI including, inter alia, a photo application UI, a social media application UI, etc. A 3D effect is applied to the application UI 302 comprising the left eye image version 202*a* (of image 202 of FIG. 2) and right eye image version 202*b* (of image 202 of FIG. 2) by providing (for the user to view via, e.g., an HMD) a left eye view 305*a* (of 3D environment 300) and a right eye view 305*b* (of the original 2D image 202). The left eye view 305*a* represents a view of the application UI 302 located at a first position (e.g., shifted horizontally in a direction 312*a*). The right eye view 305*b* represents a view of the application UI 302 located at a second position (e.g., shifted horizontally in a direction 312*b*) differing from the first position of the application UI 302 presented in left eye view 305*a*. The differing positions of the left eye view 305*a* and the right eye view 305*b* enable the user to view (when viewed via an HMD) a combination of left eye view 305*a* and the right eye view 305*b* as a merged image representing a 3D effect with respect to application UI 302 and person 208 (of image 202 of FIG. 2).

Figure 4A:
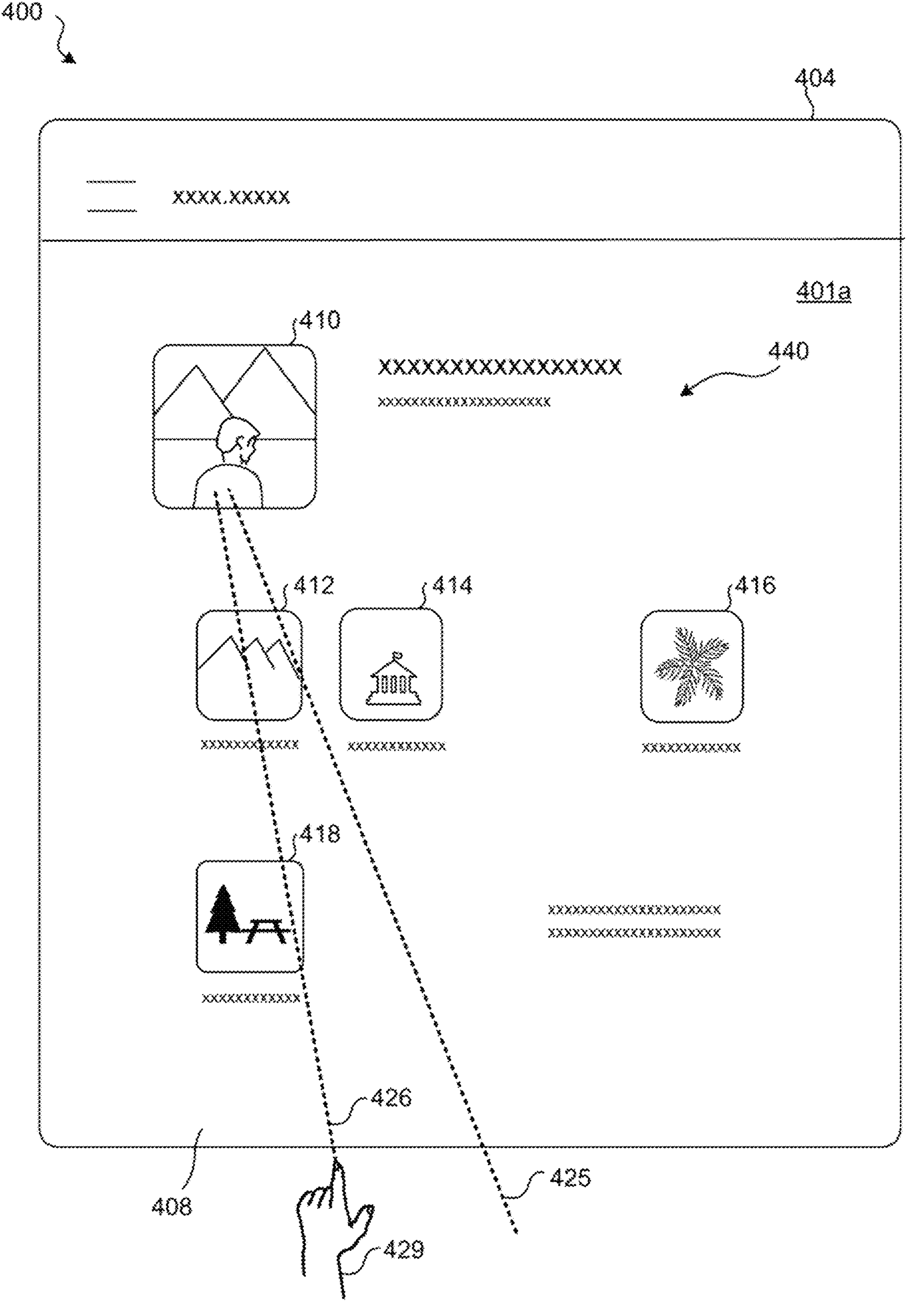
FIGS. 4A-4C illustrate views representing the application of a 3D effect to a 2D image obtained from a Webpage for enhanced viewing by a user, in accordance with some implementations.
Figure 4B:
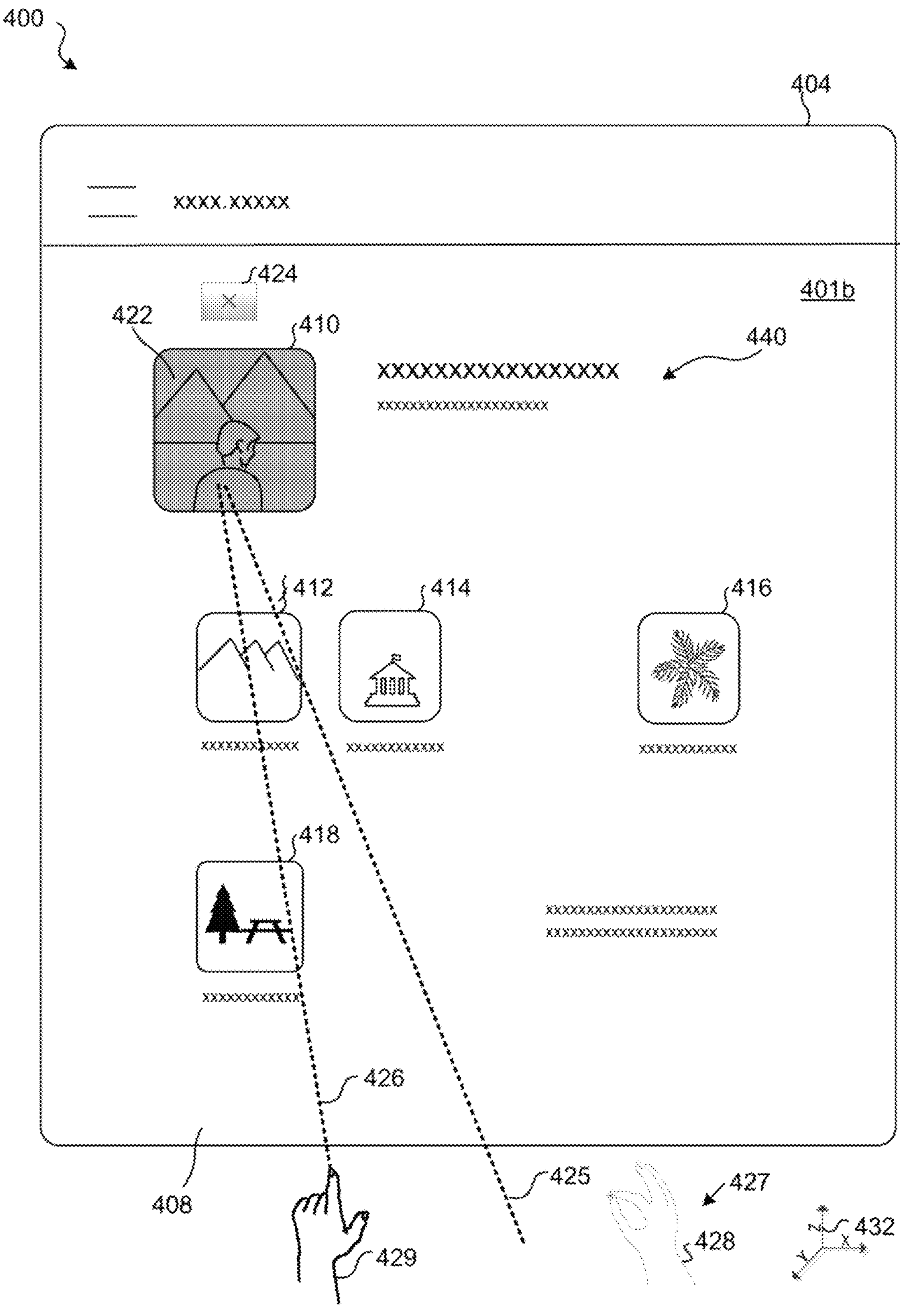
Figure 4C:
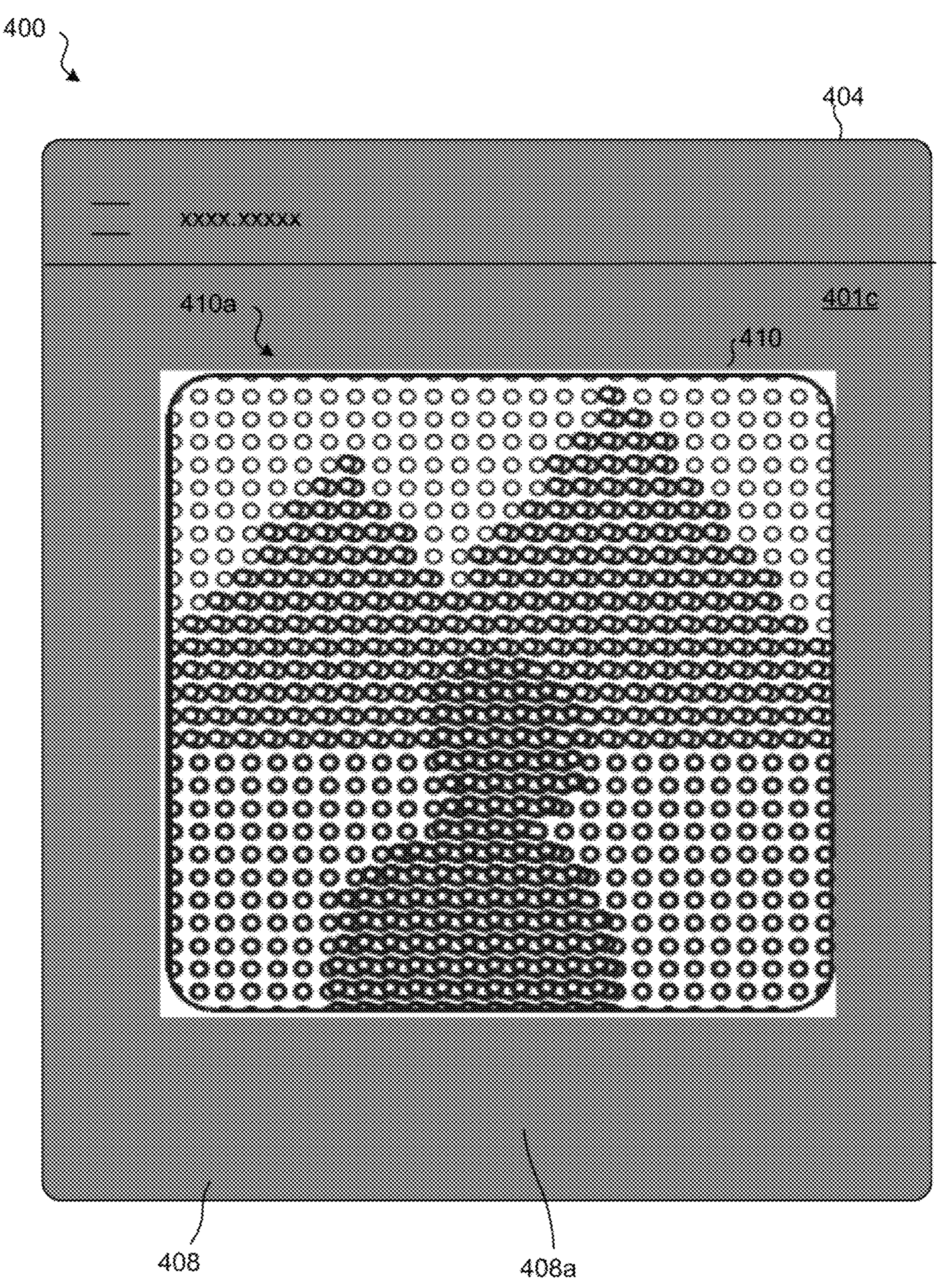

FIGS. 4A-4C illustrate views 401*a*-401*c* representing the application of a 3D effect to a 2D image (e.g., image 410) obtained from a Webpage 408 for enhanced 3D viewing by a user, in accordance with some implementations. Each of views 401*a*-401*c* include an exemplary 3D environment 400 (e.g., an XR environment) that includes a physical environment (e.g., physical environment 100 of FIG. 1 that may be viewed as pass-through video or may be a direct view of through a transparent or translucent display) and a virtual environment (e.g., including Webpage 408). Each of views 401*a*-401*c* includes Web browser 404 displaying Webpage 408. Webpage 408 includes images 410, 412, 414, 416, and 418 (e.g., photos) and text portions 440.

In the example of FIG. 4A, at a first instant in time corresponding to view 401*a*, a user gaze direction/location (illustrated by ray 425) is detected with respect to image 410 thereby indicating predicted user intent with respect to viewing image 410. Alternatively, a finger direction (illustrated by hand 429 with respect to ray 426) may be detected (instead of or in combination with the user gaze direction/location illustrated by ray 425) with respect to image 410 thereby indicating predicted user intent with respect to viewing image 410. The predicted user intent with respect to viewing image 410 may be configured to trigger an indication (e.g., a glow effect or icon) that a 3D effect may or may not be applied to image 410 as described with respect to FIG. 4B, infra. In some implementations, an image for applying the 3D effect may be selected based on prioritizing an importance of the image with respect to other portions of a Webpage. For example, with respect to FIG. 4A, image 410 may be selected for 3D application because it comprises a larger image with respect to images 412, 414, 416, and 418 and therefore it may be determined that applying a 3D effect to image 410 should be prioritized over applying the 3D effect to images 412, 414, 416, and 418.

In the example of FIG. 4B, at a second instant in time corresponding to view 401*b*, an indication (e.g., via effect 422 and/or icon 242) that a 3D effect may or may not be applied to image 410 is presented/displayed proximate to image 410. In some implementations, Web browser 404 may be configured to evaluate image 410 to determine if a 3D effect may or may not be applied to image 410. For example, Web browser 404 may evaluate image 410 and based on evaluated image attributes (e.g., the image comprises too many details, the image has borders, the image is a generic/decorative image, etc.) and/or an evaluated image quality (e.g., a low-resolution image), it may be determined that image 410 is not suitable for 3D presentation. Conversely, Web browser 404 may evaluate image 410 and based on evaluated image attributes (e.g., an image of an indoor or outdoor scene, etc.) and/or an evaluated image quality (e.g., a high-resolution image), it may be determined that image 410 is suitable for 3D presentation. Subsequently, an effect 422 and/or icon 424 associated with the evaluated image is presented (proximate to image 410) to the user. Effect 422 may comprise, inter alia, a translucent glow effect over or surrounding image 420, a border surrounding image 420, etc. Icon 424 may comprise a (virtual) button, an activator, etc.

If effect 422 and/or icon 424 indicate that image 410 is not suitable for 3D presentation, then effect 422 and/or icon 424 may be presented as a first specified indicator type such as, inter alia, a first specified color (e.g., red), a first specified transparency level, a first specified shape, etc. Subsequently, the user may gaze or point at another image (e.g., one of images 412, 414, 416, or 418) to select and trigger the evaluation process to determine if a 3D effect may or may not be applied the newly selected image.

If effect 422 and/or icon 424 indicate that image 410 is suitable for 3D presentation, then effect 422 and/or icon 424 may be presented as a second specified indicator type (i.e., differing from the first specified indicator type) such as, inter alia, a second specified color (e.g., green), a second specified transparency level, a second specified shape, etc. In response to the indication that the image 410 is suitable for 3D presentation, the user may select image 410 to apply the 3D effect. Image 410 may be selected (for 3D effect application) by receiving hand gesture input from the user. For example, the user may initiate an input command by performing a hand gesture such as a pinch gesture 427 (e.g., fingers of hand 428 coming together and touching) while simultaneously moving hand 428 in any of X, Y, and Z directions 432 (e.g., movement of hand 428 relative to a Z direction to lift or pluck image 410 with respect to webpage 408) to select the image 410 and apply the 3D effect. Alternatively, image 410 may be selected (for 3D effect application) by activating icon 424 (e.g., activating a virtual button or switch) via a hand or gaze gesture.

In the example of FIG. 4C, at a third instant in time corresponding to view 401*c*, an expanded view 410*a* of image 410 is presented/displayed for the user. Expanded view 410*a* represents an expanded 3D version of image 410 presented/displayed subsequent to application of a 3D effect such that image 410 is depicted using the 3D effect without depicting any other portions of Webpage 408 (e.g., images 412, 414, 416, and 418 and text portions 440). In this instance, image 410 is displayed as a larger size in a full screen mode thereby obscuring most of the Webpage 408 from a background region surrounding the image to enhance the user viewing experience. Alternatively, image 410 may depicted (with respect to a same size as represented in FIGS. 4A and 4B) using the 3D effect such that all portions of webpage 408 surrounding image 410 are blurred out (e.g., out of focus), obscured via a feathering or dimming effect, etc.

In some implementations, an initial view of image 410 may depict a low resolution version of the image using a 3D effect (e.g., for a preview) and a subsequent view of image 410 may depict a high resolution version of the image using the 3D effect.

Figure 5:
FIG. 5 is a flowchart representation of an exemplary method that dynamically applies a 3-dimensional (3D) effect to 2-dimensional content, in accordance with some implementations.
Figure 5:
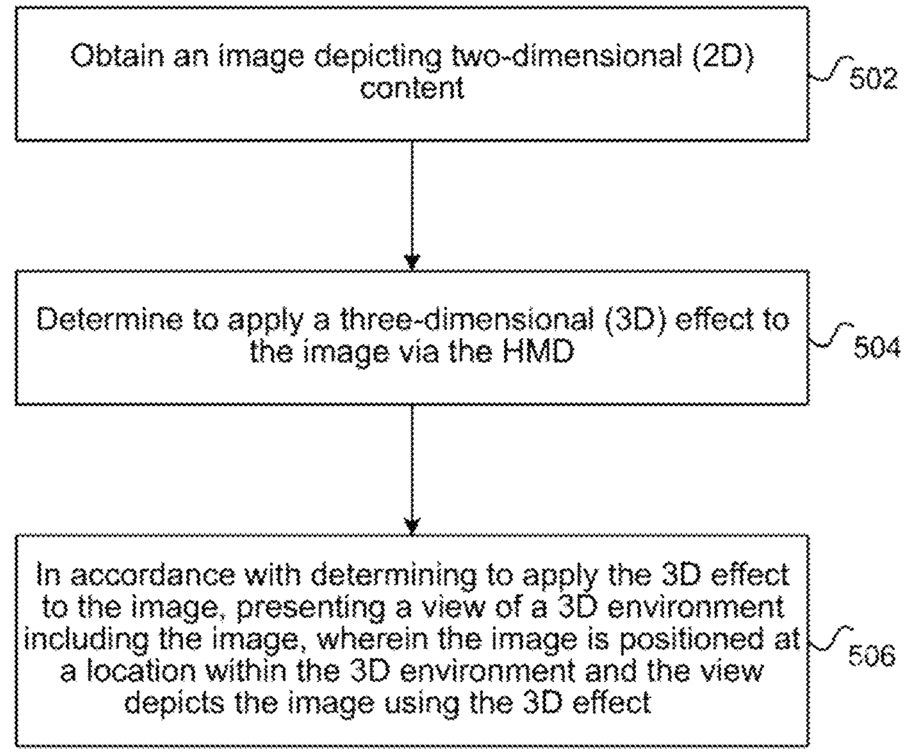

FIG. 5 is a flowchart representation of an exemplary method 500 that dynamically applies a 3-dimensional (3D) effect to 2-dimensional content, in accordance with some implementations. In some implementations, the method 500 is performed by a device, such as a mobile device, desktop, laptop, HMD, or server device. In some implementations, the device has a screen for displaying images and/or a screen for viewing stereoscopic images such as a head-mounted display (HMD such as e.g., device 105 of FIG. 1). In some implementations, the method 500 is performed by processing logic, including hardware, firmware, software, or a combination thereof. In some implementations, the method 500 is performed by a processor executing code stored in a non-transitory computer-readable medium (e.g., a memory). Each of the blocks in the method 500 may be enabled and executed in any order.

At block 502, the method 500, obtains an image depicting two-dimensional (2D) content such as, inter alia, a photo, a panoramic image, a video, etc.

At block, 504, the method 500 determines to apply a three-dimensional (3D) effect to the image in real time. In some implementations, determining to apply the 3D effect to the image includes receiving input from a user of the device (e.g., an HMD) manually initiating the 3D effect. For example, the user may manually activate a button or switch to manually initiate the 3D effect being applied to the image.

In some implementations, determining to apply the 3D effect to the image may include an automated process to apply the 3D effect to the image based on specified criteria such as, inter alia, in response to specified applications, such as a photo library application being enabled.

In some implementations, determining to apply the 3D effect to the image may include an automated process to apply the 3D effect to the image based on detecting a gaze direction with respect to the image depicting the 2D content.

In some implementations, determining to apply the 3D effect to the image may include an automated process to apply the 3D effect to the image based on content depicted within the image. For example, content (e.g., of a photo) depicting objects in nature and/or people may automatically trigger application of the 3D effect to the image.

In some implementations, determining to apply the 3D effect to the image may include an automated process to apply the 3D effect to the image based on an expected quality of the 3D effect depicting the image. For example, a photo may be determined to be error prone or noisy and therefore applying the 3D effect is not triggered.

In some implementations, determining to apply the 3D effect to the image may include an automated process to apply the 3D effect to the image based on metadata (comprising instructions) of the image depicting the 2D content.

In some implementations, determining to apply the 3D effect to the image may include an automated process to apply the 3D effect to the image based on an application developer initiated setting within an application presenting the image depicting the 2D content.

In some implementations, in response to receiving first input (e.g., gaze input, gesture input, etc.) from a user of an HMD, an indication that the 3D effect may be applied to the image (e.g., a glow effect or icon presented proximate to the image on a Webpage, etc.) is provided such that determining to apply the 3D effect to the image comprises receiving, in response to the indication, second input from the user manually initiating the 3D effect. (e.g., in response to the user activating a button or icon). The indication may be provided to the user instantaneously in real time or after a specified time period has elapsed.

In some implementations, the image may be located within a Webpage such that determining to apply the 3D effect to the image is based on prioritizing the image with respect to importance of the image with respect to other portions of the Webpage (e.g., the image is larger than other images of the Webpage).

In some implementations, the image may be located within a Webpage and in response to receiving first input (e.g., gaze input, gesture input, etc.) from a user, Web browser-based evaluation data associated with an ability to apply the 3D effect to the image (e.g., is the image suitable for 3D presentation) may be obtained. Based on the Web browser-based evaluation data, an indication that the 3D effect may be applied to the image (e.g., a glow effect or icon presented proximate to the 2D on a Webpage, etc.) is provided for the user such that determining to apply the 3D effect to the image includes receiving, in response to the indication, second input (e.g., a pinch gesture with hand movement in a Z direction) from the user of the HMD manually initiating the 3D effect.

At block 506 (in accordance with determining to apply the 3D effect to the image), the method presents a view of a 3D environment that includes the image. In some implementations, the image is positioned at a location within the 3D environment and the view depicts the image using the 3D effect.

In some implementations, the image is positioned within a planar region within the 3D environment. In some implementations, the image is positioned within a planar user interface within the 3D environment. The planar user interface may be provided by an application. In some implementations, the image may be a frame within a video such that the view depicts the video using the 3D effect.

In some implementations, an adjustable baseline (e.g., relative to a user inter pupillary distance (IPD)) may be used to provide differing effect types (e.g., realistic, exaggerated, etc.) for the 3D effect.

In some implementations, the 3D effect is provided by altering the image with respect to left and right eye views, via the display, to provide a vergence effect.

In some implementations, the 3D effect is provided by providing altered views of the image based on differing viewpoints within the 3D environment to provide a parallax effect.

In some implementations, the image may be located within a Webpage and the view may depict the image using the 3D effect without depicting any other portions of the Webpage using the 3D effect (e.g., the 3d effect is only applied to the image without applying to the Webpage).

In some implementations, the image may be located within a Webpage and the view may depict the image using the 3D effect without depicting any other portions of the Webpage (e.g., the Webpage is hidden or blurred out, the image is depicted in full screen mode, the image is surrounded by a feathering effect or a dimming effect obscuring the Web page from a background, etc.).

In some implementations, in accordance with determining to apply the 3D effect to the image, an initial view of a 3D environment including the image is presented such that the image is positioned at a location within the 3D environment and the initial view depicts a low resolution version of the image using the 3D effect. Subsequent to depicting the low resolution version of the image using the 3D effect, the view may depict a high resolution version of the image using the 3D effect.

Figure 6:
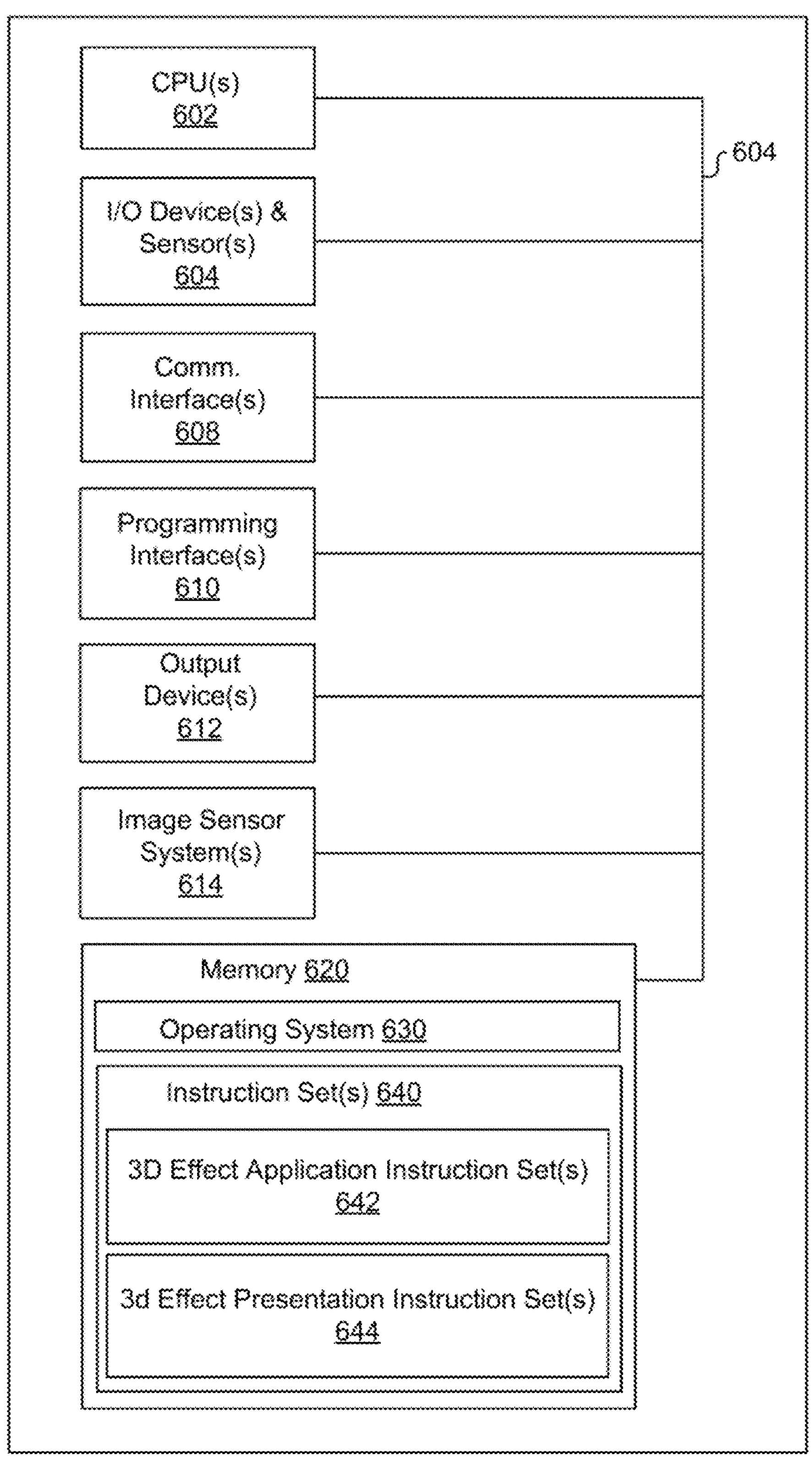
FIG. 6 is a block diagram of an electronic device of in accordance with some implementations.

FIG. 6 is a block diagram of an example device 600. Device 600 illustrates an exemplary device configuration for electronic devices 105 and 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUS, CPUs, processing cores, and/or the like), one or more input/output (I/O) devices and sensors 604, one or more communication interfaces 608 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 610, output devices (e.g., one or more displays) 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 612 are configured to present a view of a physical environment, a graphical environment, an extended reality environment, etc. to the user. In some implementations, the one or more displays 612 are configured to present content (determined based on a determined user/object location of the user within the physical environment) to the user. In some implementations, the one or more displays 612 correspond to holographic, digital light processing (DLP), liquid crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 100. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, sensor data may be obtained by device(s) (e.g., devices 105 and 110 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a 3D effect application instruction set 642 and a 3D effect presentation instruction set 644. The instruction set(s) 640 may be embodied as a single software executable or multiple software executables.

The 3D effect application instruction set 642 is configured with instructions executable by a processor to determine to apply (e.g., via manual instructions or automated instructions) a 3D effect to a 2D image via an HMD (e.g., in real time).

The 3D effect presentation instruction set 644 is configured with instructions executable by a processor to present a view of a 3D environment including the 2D image (positioned at a location within the 3D environment) depicted using the 3D effect.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a head mounted device (HMD) having a processor and a display:

obtaining an image depicting two-dimensional (2D) content within a Webpage;

in response to receiving first input from a user of the HMD, obtaining Web browser-based evaluation data associated with an ability to apply a three-dimensional (3D) effect to the image;

based on the Web browser-based evaluation data, providing an indication that the 3D effect may be applied to the image;

determining to apply a three-dimensional (3D) effect to the image via the HMD by receiving, in response to the indication, second input from the user of the HMD initiating the 3D effect; and in accordance with determining to apply the 3D effect to the image, presenting a view of a 3D environment including the image, wherein the image is positioned at a location within the 3D environment and the view depicts the image using the 3D effect.

2. The method of claim 1, wherein said determining to apply the 3D effect to the image comprises receiving input from a user of the HMD manually initiating the 3D effect.

3. The method of claim 1, wherein said determining to apply the 3D effect to the image comprises automatically determining to apply the 3D effect to the image based on criteria or based on detecting a gaze direction with respect to the image depicting the 2D content.

4. The method of claim 1, wherein said determining to apply the 3D effect to the image comprises automatically determining to apply the 3D effect to the image based on content depicted within the image or based on an expected quality of the 3D effect depicting the image.

5. The method of claim 1, wherein said determining to apply the 3D effect to the image comprises automatically determining to apply the 3D effect to the image based on metadata of the image depicting the 2D content or based on an application developer initiated setting within an application presenting the image depicting the 2D content.

6. The method of claim 1, further comprising:

in response to receiving first input from a user of the HMD, providing an indication that the 3D effect may be applied to the image, wherein said determining to apply the 3D effect to the image comprises receiving, in response to the indication, second input from the user of the HMD manually initiating the 3D effect.

7. The method of claim 6, wherein the indication that the 3D effect may be applied to the image is provided to the user instantaneously in real time or after a specified time period has elapsed.

8. The method of claim 6, wherein the image is located within a Webpage, and wherein the view depicts the image using the 3D effect without depicting any other portions of the Webpage using the 3D effect.

9. The method of claim 6, wherein the image is located within a Webpage, and wherein the view depicts the image using the 3D effect without depicting any other portions of the Webpage.

10. The method of claim 6, wherein the image is located within a Webpage, and wherein said determining to apply the 3D effect to the image is based on prioritizing the image with respect to importance of the image with respect to other portions of the Webpage.

11. The method of claim 1, further comprising:

in accordance with determining to apply the 3D effect to the image, presenting an initial view of a 3D environment including the image, wherein the image is positioned at a location within the 3D environment and the initial view depicts a low resolution version of the image using the 3D effect, and wherein subsequent to depicting the low resolution version of the image using the 3D effect, the view depicts a high resolution version of the image using the 3D effect.

12. The method of claim 1, wherein the image is positioned within a planar region within the 3D environment.

13. The method of claim 1, wherein the image is positioned within a planar user interface within the 3D environment.

14. The method of claim 1, wherein the image is a frame within a video, and wherein the view depicts the frame within the video using the 3D effect.

15. The method of claim 1, wherein an adjustable baseline is used to provide differing effect types for the 3D effect.

16. The method of claim 1, wherein the 3D effect is provided by altering the image with respect to left and right eye views, via the display, to provide a vergence effect.

17. The method of claim 1, wherein the 3D effect is provided by providing altered views of the image based on differing viewpoints within the 3D environment to provide a parallax effect.

18. A head mounted device (HMD) comprising:

a processor;

a computer readable medium storing instructions that when executed by the processor cause the processor to perform operations comprising:

obtaining an image depicting two-dimensional (2D) content within a Webpage;

in response to receiving first input from a user of the HMD, obtaining Web browser-based evaluation data associated with an ability to apply a three-dimensional (3D) effect to the image;

based on the Web browser-based evaluation data, providing an indication that the 3D effect may be applied to the image;

determining to apply a three-dimensional (3D) effect to the image via the HMD by receiving, in response to the indication, second input from the user of the HMD initiating the 3D effect; and in accordance with determining to apply the 3D effect to the image, presenting a view of a 3D environment including the image, wherein the image is positioned at a location within the 3D environment and the view depicts the image using the 3D effect.

19. A non-transitory computer-readable medium comprising instructions that when executed by a processor of a head mounted device (HMD) cause the processor to perform operations comprising:

obtaining an image depicting two-dimensional (2D) content within a Webpage;

in response to receiving first input from a user of the HMD, obtaining Web browser-based evaluation data associated with an ability to apply a three-dimensional (3D) effect to the image;

based on the Web browser-based evaluation data, providing an indication that the 3D effect may be applied to the image;

determining to apply a three-dimensional (3D) effect to the image via the HMD by receiving, in response to the indication, second input from the user of the HMD initiating the 3D effect; and in accordance with determining to apply the 3D effect to the image, presenting a view of a 3D environment including the image, wherein the image is positioned at a location within the 3D environment and the view depicts the image using the 3D effect.

* * * * *